United States Patent [19]
Sadler et al.

[11] Patent Number: 5,807,473
[45] Date of Patent: *Sep. 15, 1998

[54] ELECTROLYTIC WATER TREATMENT

[75] Inventors: Peter Sadler, Belair; John Cossich, Thebarton, both of Australia

[73] Assignee: Berrett Pty Ltd, Australia

[*] Notice: This patent issued on a continued prosecution application filed under 37 CFR 1.53(d), and is subject to the twenty year patent term provisions of 35 U.S.C. 154(a)(2).

[21] Appl. No.: 722,009

[22] PCT Filed: Apr. 11, 1995

[86] PCT No.: PCT/AU95/00203

§ 371 Date: Oct. 10, 1996

§ 102(e) Date: Oct. 10, 1996

[87] PCT Pub. No.: WO95/27684

PCT Pub. Date: Oct. 19, 1995

[30] Foreign Application Priority Data

Apr. 12, 1994 [AU] Australia ................................ PM 4983

[51] Int. Cl.[6] .................................................. C02F 1/461
[52] U.S. Cl. .......................... 205/743; 205/744; 204/228; 204/229; 204/275
[58] Field of Search .................................. 205/743, 744; 204/228, 229, 275

[56] References Cited

U.S. PATENT DOCUMENTS

| | | | |
|---|---|---|---|
| 4,087,337 | 5/1978 | Bennet | 204/95 |
| 5,221,451 | 6/1993 | Seneff et al. | 204/229 |
| 5,254,226 | 10/1993 | Williams et al. | 204/335 |

*Primary Examiner*—Arun S. Phasge
*Attorney, Agent, or Firm*—Marshall & Melhorn

[57] ABSTRACT

An apparatus and method for electrolytically treating water which includes one or more reactors. Each reactor has a liquid containing vessel and one or more pairs of electrodes. The electrodes are suitable for a continuous anodic or cathodic operation for treating water. A power source for each reactor provides voltage and current to the electrodes. A controller maintains the voltage and current provided to the electrodes. The duration of each voltage polarity applied to each electrode is substantially the same. The polarity of the voltage to the electrodes is periodically reversed during which there is a period of zero voltage applied to the electrodes between a first polarity and a second polarity. The period of zero voltage results in a substantial reduction of back e.m.f. of the reactor which enhances the service life and efficacy of the electrodes.

35 Claims, 7 Drawing Sheets

ELECTROLYTIC WATER TREATMENT

This application is a 371 of PCT/AU95/00203 filed Apr. 11, 1995.

This invention relates to a method and apparatus for water treatment. In particular a method and apparatus for water treatment including the contact of water with electrodes.

BACKGROUND ART

Electrolysis is the process whereby an electric current is used to promote the decomposition of chemical compounds. The use of electrolysis for treatment of water is known in a number of applications. These applications include the production of ionised water, the production of hypochlorite from a NaCl solution, the production of hydrogen gas. U.S. Pat. No. 4,384,943 in the name of Stoner describes a method and apparatus for the electrolytic treatment of aqueous fluids to eliminate harmful and other unwanted organisms.

Electrolytic water treatment has also commonly been used for treatment and chlorination of swimming pool water. An apparatus for the disinfection of swimming pool water is described in French patent No. 2656006 in the name of Levart. This patent describes a device which produces chlorine at the rate of 100 g/hr. Processes and means for chlorinating swimming pools are also described in U.S. Pat. No. 2,887,444 in the name of Lindsteadt. An electrolytic system for reducing the bacterial and algal levels in swimming pools which does not involve chlorine production is described in U.S. Pat. No. 4,936,979 in the name of Brown.

A problem with electrolysis based water treatment equipment is that a scale builds up on one or both electrodes. As the treatment proceeds chemical fouling occurs due to oxidation reactions occurring at the anode and reduction reactions occurring at the cathode. Biological fouling due to the build-up of neutralised organisms can also occur.

Scale build-up or fouling has a number of detrimental effects on the electrolysis process. As the scale builds up the current required to maintain the same potential between the electrodes increases. Conversely, if the current density is to be maintained the potential between the electrodes must be increased. Eventually a limit is reached where further increases in either current or voltage are not possible and the electrodes must be either cleaned or replaced.

Attempts to minimise the effects of scale formation have followed three approaches. One approach has been to develop electrode materials which minimise the build-up of scale. Another approach has been to put additives (such as vanadium pentoxide) in the electrolytic solution to slow down deposit formation. The third approach has been to periodically reverse the polarity of operation of the electrolysis apparatus and thereby reverse the chemical reactions before appreciable scale build-up has occurred.

U.S. Pat. No. 1,956,411 by Bonine discloses an automated means for reversal of polarity to increase electrode life. The Stoner invention referred to above refers to polarity reversal to increase electrode life but asserts that a higher than normal current must be supplied at reversal to complete the change in as short a time as possible, in order that as continual as possible a current is applied across the electrodes. An electrolysis apparatus which includes a manually activated polarity reversing switch is also described in United Kingdom Patent No. 2048944 in the name of Spirig.

It is an object of the present invention to provide an apparatus and method which includes contacting water with electrodes, to enhance the service life and efficacy of said electrodes.

An object of one form of the present invention is to provide an electrolytic water treatment apparatus primarily for chlorination of swimming pools.

SUMMARY OF THE INVENTION

In one form of the invention although it need not be the only or indeed the broadest form there is proposed a electrolytic water treatment apparatus comprising:

one or more reactors, each reactor comprising a liquid containing vessel and one or more pairs of electrodes, and the electrodes being suitable for continuous anodic or cathodic operation;

a power source for each reactor, said power source providing voltage and current to the electrodes;

a controller adapted to control the voltage and current provided to the electrodes, and the duration of each voltage polarity applied to each electode is substantially the same;

wherein polarity of the voltage to the electrodes is periodically reversed and during the reversal there is a period of zero voltage applied to the electrodes between a first polarity and a second polarity in which period the back e.m.f. of the reactor or reactors is substantially reduced.

In preference the period of zero voltage is sufficient to allow back e.m.f. between the electrodes to dissipate.

The electrolytic water treatment apparatus may have a multiple number of electrodes depending on the reactor output requirements. There may be an even or odd number of electrodes although an even number is preferable.

In preference the apparatus further comprises one or more fluid pumps which cause fluid to flow through the one or more reactors.

In preference the apparatus also includes a number of monitors which monitor the operation of the reactor and provide information to the controller which may modify the operation of the reactors. The controller can change the voltage, current and polarity in one or more of the reactors and can change the time that each reactor is on.

Preferably the apparatus includes a voltage restrictor that limits the voltage of the duty cycle to less than one half the nominal capacity of the electrodes.

In an alternative form the invention could be said to reside in a method of treating a liquid including the steps of passing the liquid to be treated through a reactor, each reactor comprising a liquid containing vessel and one or more pairs of electrodes suitable for continuous anodic or cathodic operation, applying a voltage and a current across said electrodes such that the duration of the voltage polarity applied to each electrode is substantially the same, reversing the polarity of the voltage to the electrodes periodically, and on reversing the polarity there is a period of zero voltage applied to the electrodes between first polarity and an opposite polarity the duration of such a period being sufficient for the back e.m.f of the reactor to be substantially reduced.

In one form the period of zero voltage is sufficient to allow back e.m.f between the electrodes to reduce by at least 50% of the voltage at switching.

Alternatively the period of zero voltage is such that the sum of the current to which the electrodes are subjected plus the back emf at the time of switching does not exceed the nominal maximum current density limit of said electrodes.

BRIEF DESCRIPTION OF THE DRAWINGS

For a better understanding the invention will now be described with reference to several embodiments which will be described with reference to drawings in which.

DETAILED DESCRIPTION OF THE DRAWINGS

Similar reference characters indicate corresponding parts throughout the several views of the drawings.

Dimensions of certain of the parts as shown in the drawings may have been modified and/or exaggerated for the purposes of clarity of illustration.

Figure 1:
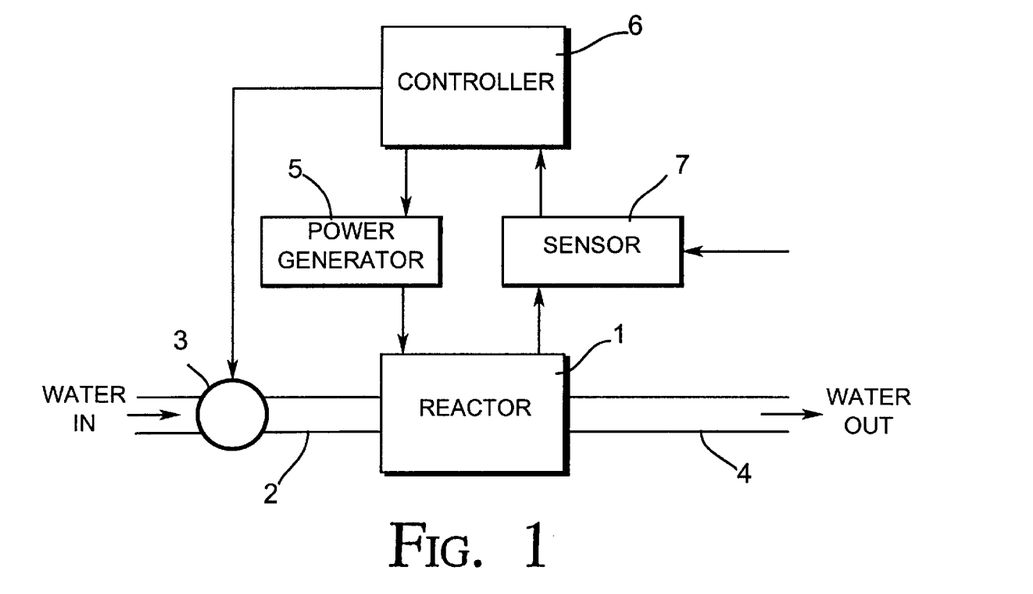
FIG. 1 is a block diagram of an electrolytic water treatment apparatus according to the invention showing the general control of a reactor.

Referring now to the drawings in detail there is shown in FIG. 1 a block diagram of an electrolytic water treatment apparatus. Water enters reactor 1 through pipe 2 under the influence of pump 3 and exits through pipe 4. Sensors 7 are shown to provide input to a controller 6 from either the reactor or perhaps another facility such as a swimming pool. A power source 5 is shown as providing power to the reactors. The controller influences the power source so that a number of parameters maybe modified. The controller also influences the pump and may also influence, for example, a brine dosing apparatus in a swimming pool.

Figure 2:
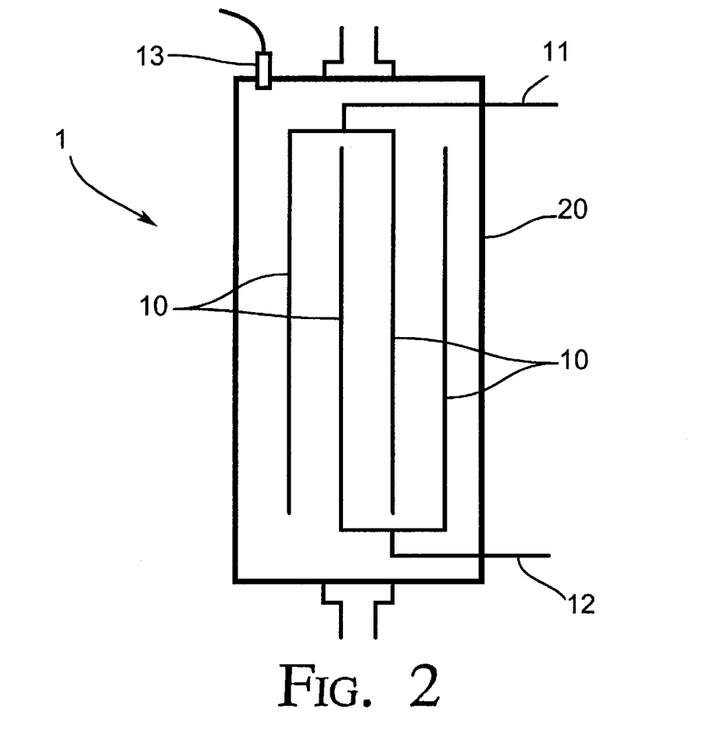
FIG. 2 is a schematic of a reactor, showing the layout of the electrodes, a sensor ad housing of the reactor.
Figure 3:
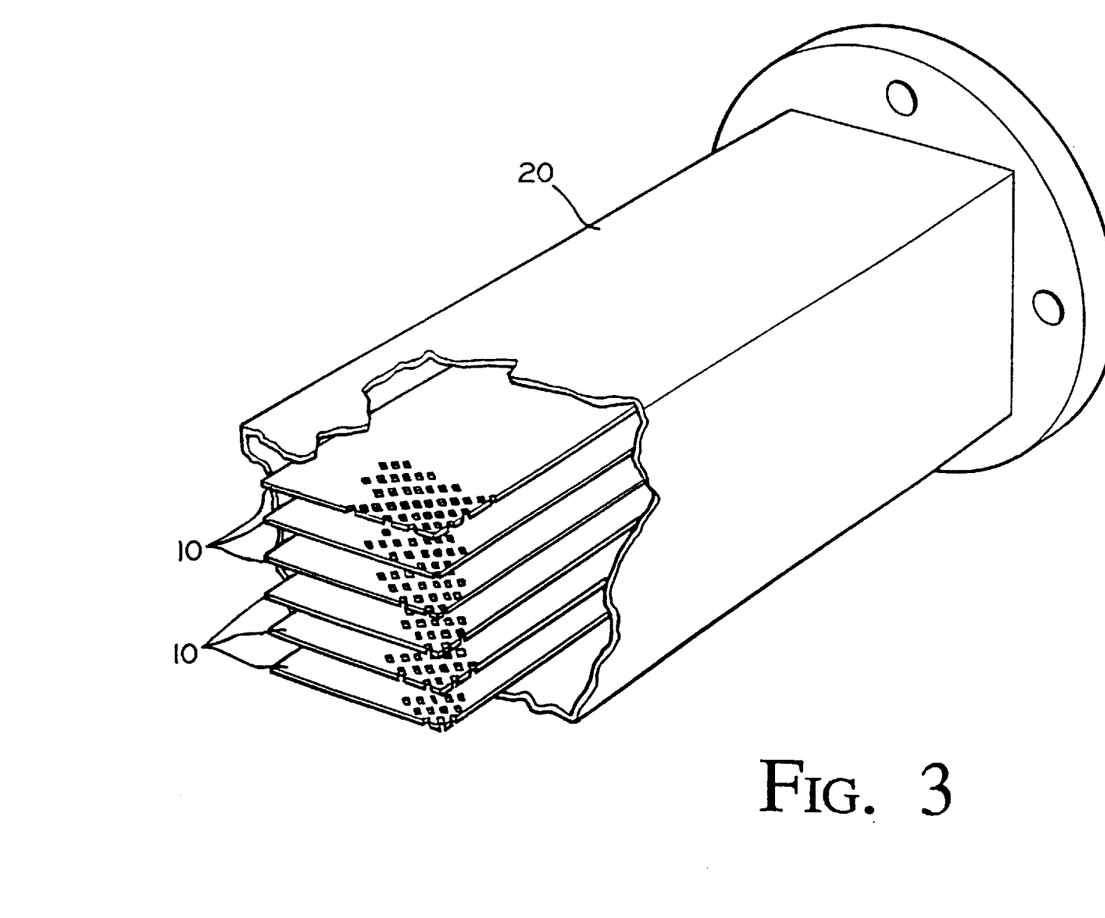
FIG. 3 is a part cut-away perspective view of a preferred form of reactor showing the layout of the electrode plates within the housing.

The reactor 1 comprises a number electrodes 10 connected, in pairs, by wires 1 and 12, as shown in plan view in FIG. 2, and in perspective in FIG. 3. Power is supplied to the electrodes 10 by a power generator 5. The power generator comprises a transformer connected to a heat sink and relay. The power generator can be supplied by an external A.C. current and supplies 9 volts DC to the electrodes. The current can be controlled and varied and it is possible to supply an operating current density of up to 800 amps per square meter of electrode surface but a different limit may be imposed depending upon the nominal maximum limit for the particular electrodes being used. The control of this power supply will be described in more detail below.

The reactor vessel comprises a housing 20, made of reinforced glass fibre with a maximum pressure rating of 1300 kPa, and supported within the housing are plate electrodes 10, spaced apart from one another, alternatively arranged with one of a first polarity adjacent one of a second polarity, and supported in that position by nonconductive supports (not shown). Each electrode comprises an expanded mesh. In the embodiment shown in FIG. 3 each plate is about 300 mm long and 55 mm wide. The electrodes are spaced apart at centres of 6.5 mm. The reactor vessel has an internal cross sectional area of 65 mm by 65 mm and being perhaps 410 mm long. It is to be understood that these dimensions are only those of one embodiment and that there could be great variation in the number of electrodes, in the shape and dimensions and the electrodes and the spacings therebetween. The spacings may also be varied depending on, amongst other parameters, the conductivity of the medium to be passed through the reactor, a range of between 2 mm to over 10 mm may be useful.

The electrodes may be constructed of any material suitable for the purpose for which they are intended, and variations of electrodes suitable for current reversal are known and may be used. The present inventors have experimented with titanium electrodes that are suitably coated, such as with coating known as EC400 or EC600 coatings, and the EC 400 is preferred. Such electrodes are commercially available. Such electrodes have a nominal maximum current density capacity of 800 amps per square meter and therefore as an absolute maximum the power source is regulated to provide no more than 800 amps per square meter.

These electrodes have a nominal maximum current capacity of 800 amps beyond which their longevity is said to radically decrease. It is found that the present reactors are used at a much lower maximum current density of 250–300 amps per square meter for most applications to still give a beneficial effect. This is possible because of the manner in which they are maintained clean and because use at a lower current density adds to the longevity.

The power supplied to the electrodes 10 is controlled by controller 6. The controller comprises a microprocessor and associated memory containing a program that determines the characteristics of the signal applied to the electrodes 10. The controller may conveniently be a commercially available programmable logic controller (PLC). The output of power to each of the electrodes is controlled and the polarity of can be reversed. The controller in most instances may also be used to monitor a number of other facilities as will become apparent below.

Figure 5:
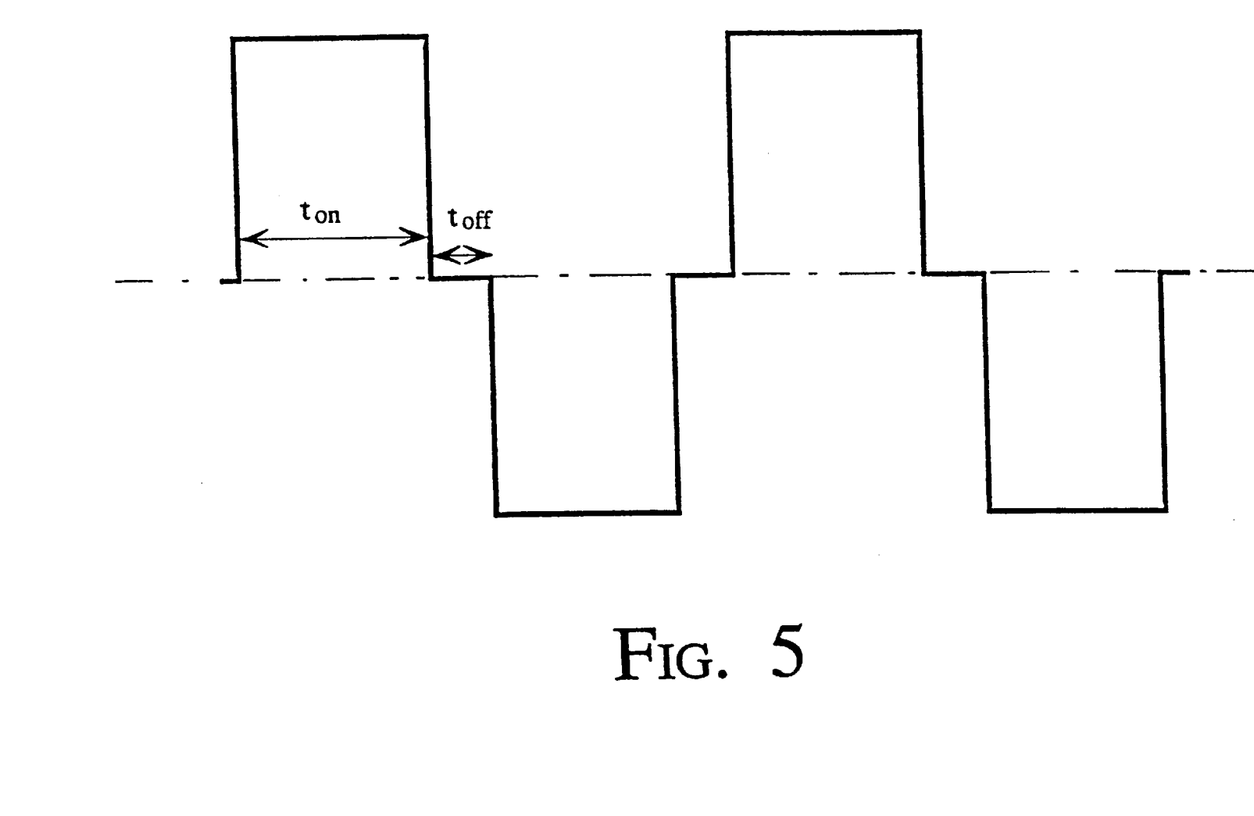
FIG. 5 is a timing diagram for the operation of one electrode with duty cycles of opposite polarity as well as the dead periods with zero voltage between the duty cycles, FIG. 6 exemplifies the range of applications of the invention.
Figure 6:
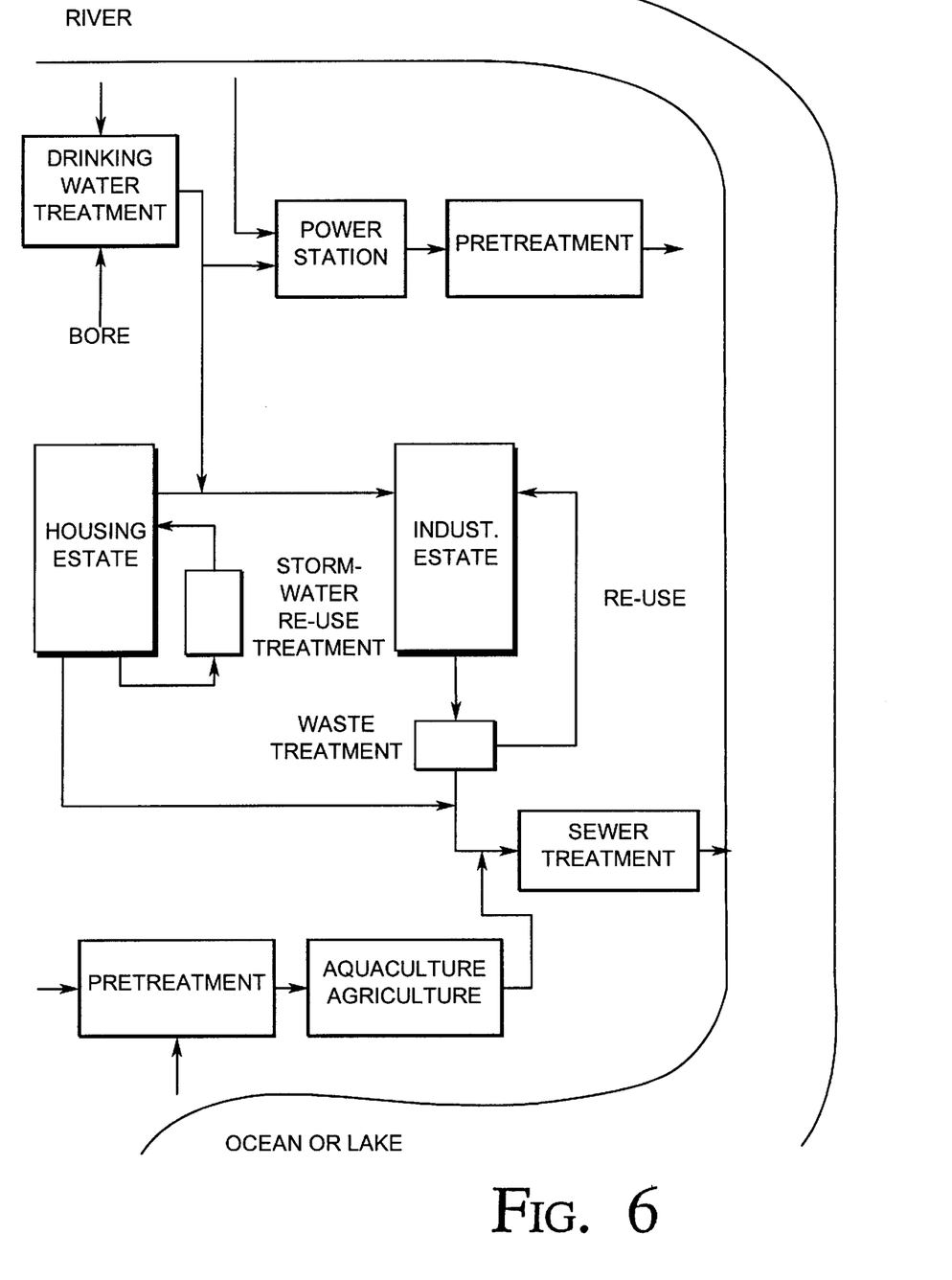
Figure 7:
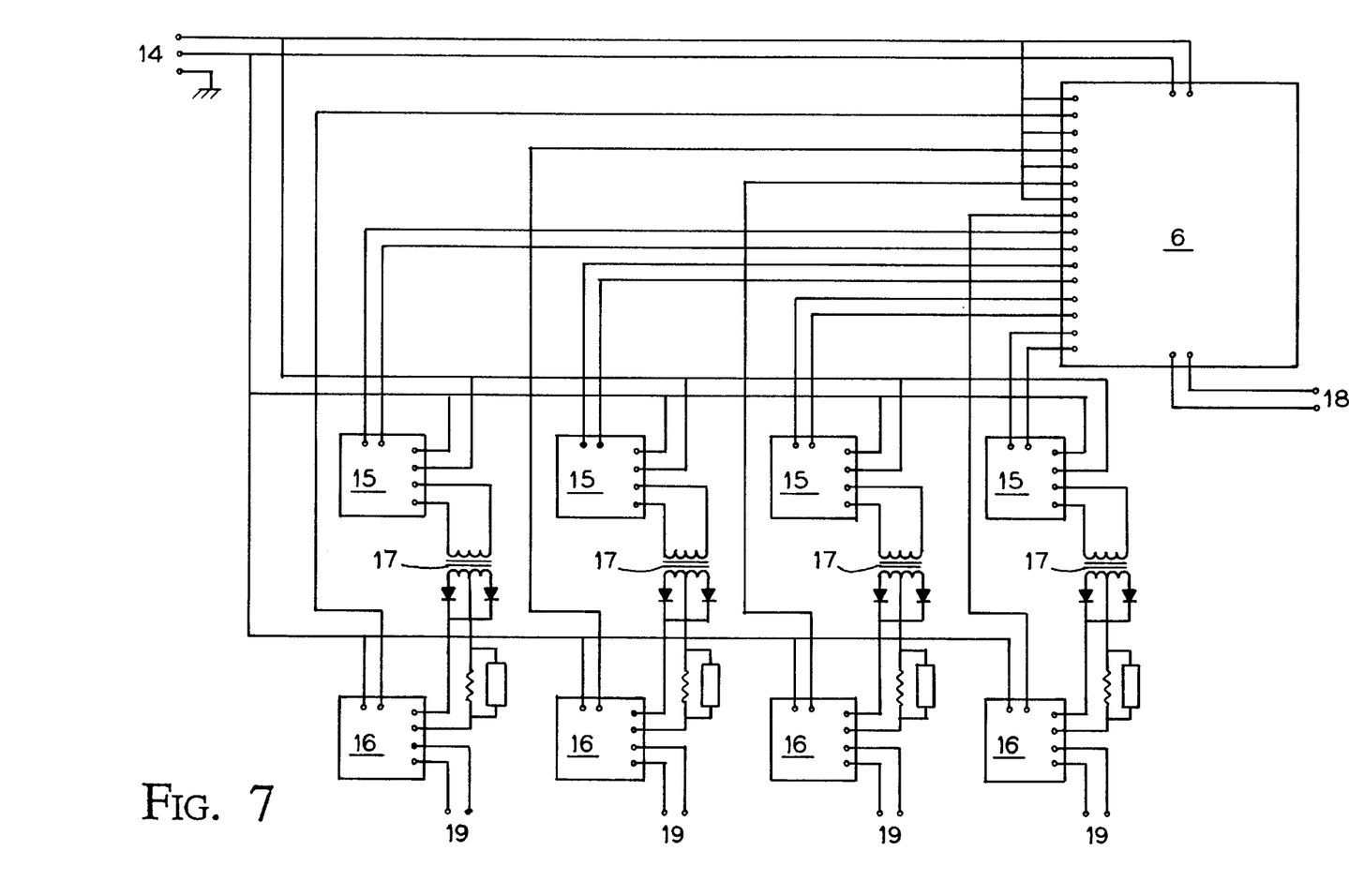
FIG. 7 is a block diagram of control of embodiments having a multiple reactors such as shown in FIG. 4.

A typical waveform for the operation of each of the electrodes of the apparatus for swimming pool chlorination is shown in FIG. 5. A voltage of one polarity is applied across the lines 11 and 12 for a time $\tau_{on}$ determined by the programmed controller. The duration $\tau_{on}$ may vary from five minutes to 24 hours or perhaps more depending on the specific application. After this period $\tau_{on}$ the voltage is reduced to zero for a time $t_{off}$ sufficient to allow the back e.m.f. in the cell to dissipate to an acceptable level. The voltage is then reapplied but with opposite polarity. The cycle, as depicted in FIG. 5, is repeated continuously.

The $\tau_{on}$ period will vary depending upon the deposit or fouling expected from the application to which the reactor is put. In a typical swimming pool chlorination application $\tau_{on}$ is set at 4 hours and $\tau_{off}$ is set at 2 minutes. For other applications with the reactor shown in FIG. 3 the inventors have found that the timings shown in the following table are suitable.

|  | $\tau_{on}$ | $\tau_{off}$ |
|---|---|---|
| oil/water separation | 15 mins | 1 min |
| pool chlorination | 4 hrs | 2 min |
| drinking water sterilisation | 24 hrs | 5 min |
| industrial waste treatment | 1 hr | 2 min |
| sewerage | 8 hr | 2 min |

It is found that by periodically reversing the polarity of the electrodes and allowing time for back e.m.f.'s to settle the fouling of the electrodes is substantially reduced, the life of the electrodes is increased and the efficiency of each cell is maximised.

The operation of the reactor with the above waveform is, it is understood, generally not for continuous extended periods, but may be operated for periods appropriate for the application. Thus for a domestic swimming pool it may only be necessary to activate a reactor for 2 hours for each day. For a public swimming pool the activation will be for much greater periods of time and peak periods continuously. The extent of use that is required can be monitored as will be explained below. For supply of potable water on the other hand it will be understood that a continuous treatment is desirable. The time over which the reactor is active may be controlled by the controller on a set time basis, so that where peak use of a swimming pool has been ascertained, the reactor can be active at set times. Preferably however, the controller may receive input from sensors reactive to parameters pertinent to the function performed to activate the reactor when limits for those parameters are reached.

Figure 4:
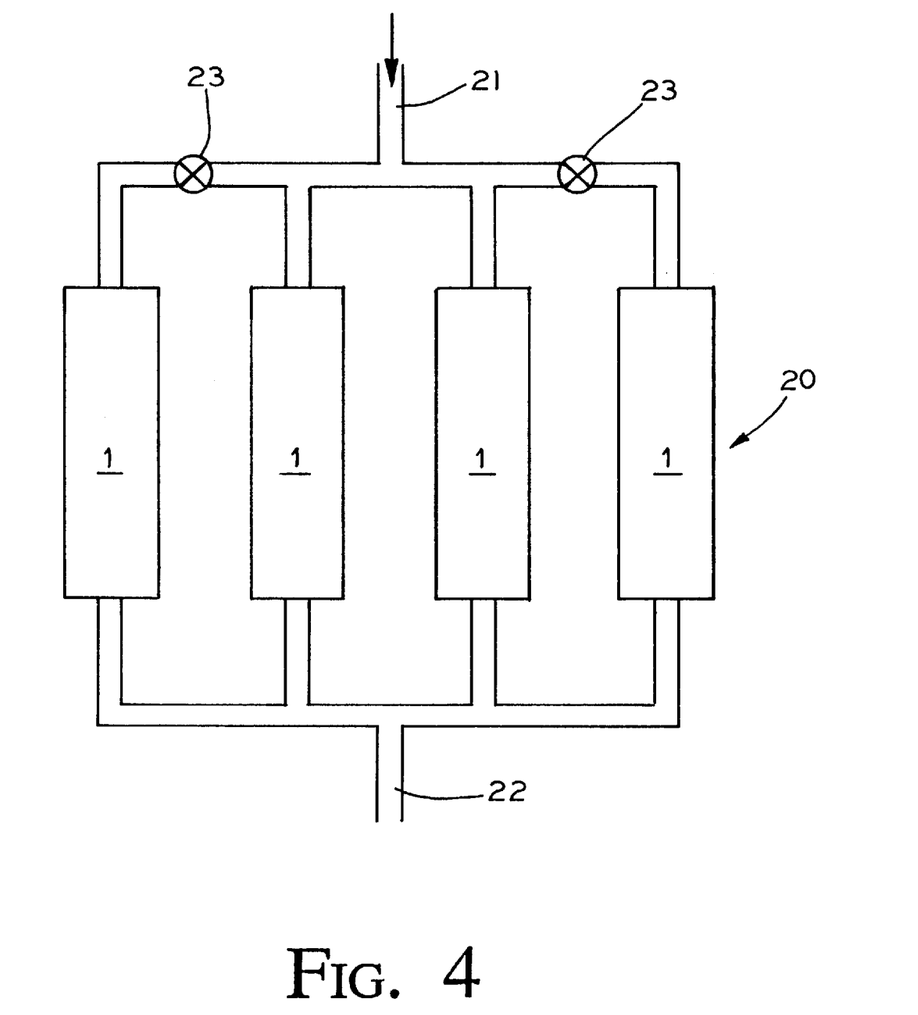
FIG. 4 is a flow diagram where illustrating the use of multiple reactors.

In many instances it may be desirable to have more than one reactor in a bank of reactors 20 such as shown in FIG. 4. Either configured as shown in FIG. 4 to act on a common inlet 21 and outlet 22, or on a separate outlet or inlet. The controller can be configured to act on each of the reactors separately. When a greater capacity is required, all four reactors can be active, and when a lesser capacity is required then the reactors can progressively be switched off by turning off the reactors and appropriate valves 23. This gives a greater flexibility to the extent to which a plant comprising such a treatment apparatus can operate.

A function of the microprocessor in a multiple reactor apparatus is shown in FIG. 4. In this embodiment mains power to the apparatus is supplied on lines 14. The controller 6 controls the operation of individual power controllers 15 (one per reactor). Power from the power controllers 15 is transformed by transformers 17. Reversing relays 16 are controlled by the controller 6 and determine the polarity of the current supplied to the reactors on lines 19. Signals from a gas monitor (not shown) are supplied to the controller 6 on lines 18. The microprocessor selects which cells to activate dependent on treatment capacity required. For example, in the embodiment of FIG. 4 two reactors may be operated continuously and the other two reactors may only be brought on line when additional treatment capacity is required. Control lines for valves and sensors have not been shown In an embodiment useful for a swimming pool the extent of electrolytic activity required is particularly dependent upon the extent of disinfectant in the pool. In such an application the redox value of the solution in a reactor is monitored by sensor 7 and is provided to the controller as an input to the program. Additionally a pH sensor can also be provided, or a conductivity meter, readout of both can be provided to the controller, such that when a limit of each of them or a limited calculated from one or more of them is reached the controller activates or deactivates one or more of the reactors as required.

A further sensor 13 may be provided to measure the potential for the build up of gas. The further sensor may be a sensor to measure the flow rate of water through the reactor or pipes leading up to the reactor. The controller switching off the reactor where the flow rate drops below a limit so that a potentially explosive build-up of gasses does not occur. It will be understood that where the flow of water stops gas build up will occur. The gas monitor provides a safety factor by monitoring the levels of hydrogen and oxygen in the cells to avoid the build up of explosive mixtures.

Where there is a bank of two or more reactors, the controller may also take into account manual disconnection of one of the reactors. Thus where maintenance of one of the reactors is necessary and removal is necessary then an appropriate, compensating, level of operation of the other reactors is assumed.

The apparatus may also be operated continuously irrespective of the inputs from the monitors. It will be appreciated that the microprocessor in the controller allows for these and other operating modes to be selectable.

The power controllers 15 also provide a safety factor by having a selectable current limit to prevent current overload of the apparatus. The current limit and the operating current is controlled by the controller 6. The current limit for use with the illustrated reactor is 25 amps. Given that the total area of electrodes for a reactor is about 0.1 meters, the maximum current density for the electrodes will not exceed 250 amps per square meter. This is considerably lower than the nominated maximum capacity of the electrodes of choice (800 amps per square meter). Given the ability of the present invention to maintain the cleanliness of the electrodes and the integrity of the electrical connections that are in contact with the liquid being treated, it is found that such a level of current is perfectly adequate for most operations. The use of a current less than half the nominal maximum capacity adds to the longevity of the electrodes.

The action of the present invention is not fully understood, however, a suggested explanation is given below. Where current is switched off between a pair of electrodes after a duty cycle, a back e.m.f. results, and this is thought to result because of polarisation effects. The back (electromotive force) e.m.f. acts in reverse polarity to that supplied by the current. Where there is no dead period, and the electrodes are reversed immediately it is suggested that the back e.m.f. adds to the reverse polarity current supplied and the cumulative current has a wearing effect on the electrode for the period over which the e.m.f. is operative. The extra stress on the electrodes or electrical connections exposed to the back emf and the liquid being treated can cause extra shedding of the electrode or the exposed electrical component. The wearing or shedding effect is compounded by the highly reactive environment in which the electrodes operate. Not only is the normal solution of, for example, the pool having a reactive halogen content present, the environment also has highly reactive gasses and other free radicals at greatest concentration near the electrodes. Such agents not only act on compounds present in the water, but also act on the electrodes, exposed electrical component and on the coatings on the electrodes. Thus negative aspect of back e.m.f. and current supply acting on the electrodes are exacerbated by the highly reactive compound being used.

Figure 8:
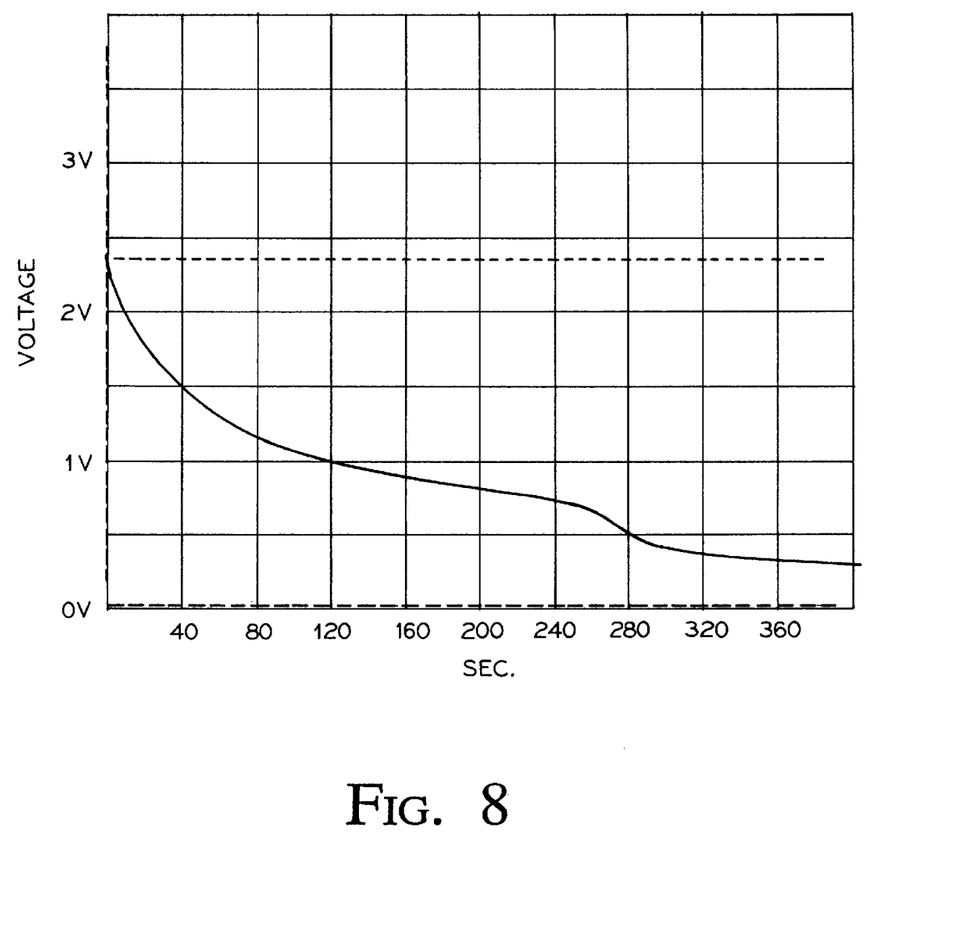
FIG. 8 is a graph of empirical data of an experiment showing decay of e.m.f. derived from one embodiment of the invention.

FIG. 8 is illustrative of the results obtained in measuring the back e.m.f obtained by operating in a reactor of the type shown in FIG. 3 under conditions present in a swimming pool a concentration of NaCl at 2000 ppm. The potential difference across the plates was 9 volts with a duty cycle of 20–25 amperes direct current for a period of 4 hours. The graph shows the measurement of back e.m.f. by a voltmeter.

It can be seen that the back e.m.f. occurs essentially instantaneously. The back e.m.f. is initially 15–30% of operating voltage, however this increases as duration of duty cycles increases. Visible voltage decay of back e.m.f. occurs over a period of at least 10 minutes but halves within about 2 minutes. The voltage decay is approximately logarithmic but displays a plateau.

Whilst certain time period of dead time of $\tau_{off}$ have been empirically determined as a result of experimentation as set out in Table 1, these time periods for $\tau_{off}$ however may be varied depending upon the current applied, the solution in which the electrodes are supported and the nature of the electrodes, as well as a great number of other factors. An experiment as conducted above can give a very good guide as to an appropriate dead time for any particular situation.

The decay of back e.m.f. is varied considerably depending upon the circumstances present. Several influences are detailed below, but it is to be understood however that other influences may also impact. The plateau is thought to be a function of the dissolved ions in the water. The plateau becomes more pronounced as the length of the duty cycle increases. It is also found that the rate of voltage decay is proportional with the electrolytic level; thus the rate increases as the pH moves further from neutral. The rate of voltage decay is proportionate with the ease of ionization of the fluid medium. Thus although water is neutral it is easily ionizable and therefore aids increased rate of voltage decay. The rate of voltage decay is also proportional to temperature and inversely proportional the time of the duty cycle. Increased input current will cause a longer decay time. This does not necessarily means a change in decay rate. Changes of input voltage will cause similar variations to decay time.

In a further preferred embodiment the invention has been arranged in a modular fashion on a skid platform. Each module includes: one or more pre-filters, power generators, reactor cells, automatic micron self cleaning filters, controller and analytic sensing monitors selected from pH, redox, TDS, salinity, temperature, oxygen and specific ions.

The invention may find many applications such as shown in FIG. 4. It will be appreciated that variations on the specific embodiments described will be evident to those skilled in the art but these variations will not depart from the spirit of the invention.

Three different applications of the reactor will now be discussed in a little further detail.

One such application of the invention is in the disinfection of swimming pools, in particular where Salt water (NaCl) pools are used, to create the active $Cl^-$ component. With large swimming pool applications four reactors of the type discussed above having 6 electrode plates spaced apart by 6.5 mm are used giving a total area of approximately 0.1 square meters. A restrictor is put in place to prevent a current greater than 25 amps being supplied to each reactor to give rise to maximum current density of about 250 amps per square meter.

The NaCl under the influence of the highly reactive gasses ($H_2$ and $O_2$) produced by the electrodes configure the halogen Cl in a very reactive state, which is present as a residual disinfectant to maintain the pool.

The swimming pool installation to which this description is directed is a public swimming pool. The plant put into place includes a brine dosing arrangement, release of measured quantities of brine is controlled by the controller. The plant includes sensors for measuring pH, Redox and Conductivity to assess the level of NaCl in the pool water. The level of NaCl in the water can be measure by conductivity. It is desired to have a level of approximately 3000 p.p.m in water, which equates to a conductivity value of approximately 1800 to 2000 $\mu$siemen. If the value drops below 1800 then a measured dose of brine is added to the pool by a brine dosing arrangement.

Similarly a minimum level of disinfectant is specified by the regulatory authority, being about 2 mg/liter. A desired level of 2.5 mg/liter is maintained to ensure that sudden heavy use does not drop the disinfectant level below 2 mg/Liter. The level of disinfectant can be ascertained by the redox sensor or the redox sensor in combination with the pH sensor, because the disinfectant used is highly oxidising. A redox level of 650 milli volts is measured as a desirable level. Should the level of disinfectant drop below, for example 2.2 mg/liter when two reactors are in continuous operation the third and or fourth reactors may be activated to provide a boost to the level of disinfectant In periods of low use, such as perhaps overnight, none of the reactors will need to be operational continuously to maintain the desired level of disinfectant.

Two pairs of reactors have been trialled, in the treatment of water in swimming pools, under conditions described above. A first of the reactors had been controlled such that no dead period existed, a second of the reactors had a dead period as prescribed above. The first electrodes failed in approximately 3 and a half months. The electrical connections leading to the electrodes corroded right through. Additionally the coating on the first electrode had eroded to an extend that more than half the titanium was exposed. After three months the second electrode had no evidence of corrosion either on the electrical connections or the electrode and is still operating after approximately 5 months. It is estimated that the life of the second electrode will be about 2 years.

Another application of the invention is in the treatment of water to provide a degree of disinfection and cleaning up of biological and metal residues. This may be for the pretreatment of water intended to be potable. Alternatively it may be in the treatment of sewage waste for example tertiary sewage, before being let out into water ways. For potable water, water is to be passed through a reactor at a flow rate of approximately 0.25 liters per second to ensure that the retention time in the reactor is sufficient to kill microorganisms. The action of the highly reactive gasses and the direct effect of the electric current has a killing effect that drastically reduces the bacterial and protist count of the water. Again the longevity of the electrodes is enhanced using the dead period between reversal of polarity of the electrodes.

Where tertiary sewage is treated (usual discharge from sewage treatment plants) it is found that the bacterial and protist count is still quite high. The turbidity and heavy metal content of the water is also quite high. Passing through the reactor of such water drastically reduces the micro-organism count, and the heavy metal content, however it is better to then pass the so treated water through a membrane filter, to further reduce the turbidity and to filter out any heavy metals that may have been coagulated with the remaining biological material. The filter is a membrane filter with a nominal separation cut-off of 30,000 daltons.

A third application to be explained is the operation of the invention in the cleaning up of industrial wastes, in particular where emulsions of oil are produced. It is found that by introducing a batch of waste into a settling tank, thereafter passing the emulsion through a reactor, for about 4 reversals of about 12 minutes each that a settling effect is achieved, with oil being separated to the top of the settling tank, lightly emulsified solution comprises the bulk of the material, and settles to the middle of the tank, and a sediment sludge forms to the bottom of the tank. After treatment with the reactor the lightly emulsified solution can be passed through a filter to filter out the oil, appropriately, with a very much increased life of the filter being achieved. The water being sufficiently good to discharge into water ways.

A further application of the invention is to provide an apparatus which is capable of removing from water one or more of: colloidal solids; metals; chemicals; oils; complex carbohydrates; carbonates; phosphates; nitrogen; ammonia; and pesticides.

A still further application of the invention to provide an apparatus useful for one or more of: drinking water processing; effluent treatment; sewerage treatment; process water treatment; conditioning of cooling circuit water; control of legionella, waste water treatment for discharge; waste water treatment for re-use; and prevention of precipitates in water storage systems.

We claim:

1. An electrolytic liquid treatment apparatus comprising:
   at least one reactor for containing a liquid, the reactor or each reactor containing at least a pair of electrodes for immersion in and treatment of the liquid; power supply means with a pair of wires connected to the electrodes to provide voltage across the electrodes and current to the electrodes, the power supply means including controlled switch means for interruption of voltage across the electrodes and for changing which of the pair of wires are connected to which the electrodes thereby providing means to change a polarity of voltage across said electrodes; and
   controller means to control wear of the electrodes by control of current generated by back E.M.F. between electrodes, the control means controlling the controlled switch means so that voltage across the electrodes is of a first polarity, then interruption of voltage for a period of time to enable substantial reduction in back E.M.F. between electrodes, and application of voltage to the electrodes of a second polarity opposite to the first polarity.

2. An apparatus as in claim 1 comprising electrodes suitable for continuous anodic and cathodic operation.

3. An apparatus as in claim 1, wherein the period of time of voltage interruption is sufficient to allow the back E.M.F. to reduce by at least 50%.

4. An apparatus as in claim 1 wherein the period of time of voltage interruption is sufficient to allow the back E.M.F. to reduce by at least 80%.

5. An apparatus as in claim 1 wherein the period of time of voltage interruption is sufficient to allow current surge at application of voltage of the second polarity to be less than a maximum rated current for the electrodes.

6. An apparatus as in claim 1 wherein the period of time of voltage interruption is sufficient to allow current surge at application of voltage of the second polarity to be less than 60% of a maximum rated current for the electrodes.

7. An apparatus as in claim 1 wherein the electrodes are made of titanium coated with a coating EC400, and the period of time of voltage interruption is sufficient to allow electrode current density for electrode surface area during current surge at application of voltage of the second polarity to be less than 800 amps per square meter.

8. An apparatus as in claim 1 wherein the electrodes are made of titanium coated with a coating EC800, and the period of time of voltage interruption is sufficient to allow electrode current density for electrode surface area during current surge at application of voltage of the second polarity to be less than 800 amps per square meter.

9. An apparatus as in claim 1 wherein the period of time of voltage interruption is greater that 1 minute.

10. An apparatus as in claim 1 wherein a period of time of voltage of the second polarity is substantially the same as a further period of time of voltage of the first polarity and each period of voltage of the first or second polarity is greater than 1 minute.

11. An apparatus as in claim 1 wherein a period of time of voltage of the second polarity is substantially the same as a further period of time of voltage of the first polarity and each period of voltage of the first or the second polarity is greater that 15 minutes.

12. An apparatus as in claim 1 wherein a period of time of voltage of the second polarity is substantially the same as a further period of time of voltage of the first polarity and each period of voltage of the first or the second polarity is greater than 23 hours.

13. An apparatus as in claim 1 wherein a period of time of voltage of the second polarity is substantially the same as a further period of time of voltage of the first polarity and each period of voltage of the first or the second polarity is greater than 3 hours.

14. An apparatus as in claim 1 wherein the reactor or each reactor contains an even number of electrodes.

15. An apparatus as in claim 1 wherein the controller means further comprises at least one monitor which monitors the operation of the reactor or each reactors, and the controller means controls the controlled switch means in response to the monitored operation of the reactor or each reactor by adjusting one or more of magnitude of voltage across the electrodes, current flowing through the electrodes, polarity of voltage across the electrodes, period of time of the first or second polarity, and period of time of voltage interruption between voltage of first and second polarity.

16. An apparatus as in claim 1 further comprising fluid inlet means connected to the reactor or each reactor for carrying liquid thereto, fluid outlet means connected to the reactor or each reactor for carrying liquid therefrom, and one or more liquid pumps connected to the fluid inlet means for pumping liquid through the reactor or each reactor.

17. An apparatus as in claim 16 wherein the controller means further comprises a flow meter means to measure the flow of liquid through the reactor or each reactors, and interrupts voltage across the electrodes when the flow of liquid is below a predetermined flow rate.

18. An apparatus as in claim 1 further comprising redox probe means for measuring the redox of the liquid, solids dosing means for dosing the liquids with solids, and the controller means activates the solids dosing means to dose the liquid when the redox of the liquid as measured by the redox probe is past predetermined level.

19. An apparatus as in claim 1 wherein the power supply means further includes current restricting means to restrict current flow from the power supply means through the electrodes.

20. An apparatus as in claim 19 wherein the current restricting means limits current from the power supply means form the electrodes to less than 50% of a maximum current rating of the electrodes.

21. A method of treating a liquid with an electrolytic liquid treatment apparatus comprising:
   (a) providing at least one reactor for containing a liquid, the reactor or each reactor containing at least a pair of electrodes for immersion in and treatment of the liquid;
   (b) providing a power supply means with a pair of wires connected to the electrodes to provide voltage across the electrodes and current to the electrodes, the power supply means including controlled switch means for interruption of voltage across the electrodes and for changing which of the pair of wires are connected to which of the electrodes thereby providing means to change a polarity of voltage across said electrodes;
   (c) controlling the controlled switch means so as to apply voltage across the electrodes of a first polarity;

(d) interrupting voltage between the electrodes for a period of time to enable substantial reduction in back E.M.F. between electrodes; and (e) applying voltage to the electrodes of a second polarity opposite to the first polarity, whereby the method controls wear of the electrodes by control of current generated by back E.M.F. between electrodes.

22. A method as in claim 21 wherein the step of interrupting voltage is for a period of time is sufficient to allow the back E.M.F. to reduce by at least 50%.

23. A method as in claim 21 wherein the step of interrupting voltage is for a period of time is sufficient to allow the back E.M.F. to reduce by at least 80%.

24. A method as in claim 21 wherein the step of interrupting the voltage is a period of time is sufficient to allow current surge at application of voltage of the second polarity to be less than a maximum rated current for the electrodes.

25. A method as in claim 21 wherein the step of interrupting the voltage is for a period of time is sufficient to allow current surge at application of voltage of the second polarity to be less than 60% of a maximum rated current for the electrodes.

26. A method as in claim 21 for controlling an electrolytic liquid treatment apparatus with electrodes made of titanium coated with a coating EC400, wherein the step of interrupting the voltage is for a period of time is sufficient to allow electrode current density for electrode surface area during current surge at application of voltage of the second polarity to be less than 800 amps per square meter.

27. A method as in claim 21 for controlling an electrolytic liquid treatment apparatus with electrodes made of titanium coated with a coating EC800, wherein the step of interrupting the voltage is for a period of time is sufficient to allow electrode current density for electrode surface area during current surge at application of voltage of the second polarity to be less than 800 amps per square meter.

28. A method as in claim 21 the step of interrupting the voltage is for a period of time greater than 1 minute.

29. A method as in claim 21 wherein the step of applying voltage of the second polarity is for a period of time which is substantially the same as a further period of time of the step of applying voltage of the first polarity and each period of voltage of the first or second polarity is greater than 1 minute.

30. A method as in claim 21 wherein the step of applying voltage of the second polarity is for a period of time which is substantially the same as a further period of time of the step of applying voltage of the first polarity and each period of voltage of the first or the second polarity is greater than 15 minutes.

31. A method as in claim 21 wherein the step of applying voltage of the second polarity is for a period of time which is substantially the same as a further period of time of the step of applying voltage of the first polarity and each period of voltage of the first or the second polarity is greater than 1 hour.

32. A method as in claim 21 wherein the step of applying voltage of the second polarity is for a period of time which is substantially the same as a further period of time of the step of applying voltage of the first polarity and each period of voltage of the first or the second polarity is greater than 3 hours.

33. A method as in claim 21 for a controller means further comprising at least one monitor for monitoring the operation of the reactor or each reactor, and the method including the step of controlling the controlled switch means in response to the monitored operation of the reactor or each reactor by adjusting one or more of magnitude of voltage across the electrodes, current flowing through electrodes, polarity of voltage across the electrodes, period of the first or second polarity, and period of the voltage interruption between voltage of the first and second polarity.

34. A method as in claim 21 for an electrolytic liquid treatment apparatus that further comprising fluid inlet means connected to the reactor or each reactor for carrying liquid thereto, fluid outlet means connected to the reactor or each reactor for carrying liquid therefrom, one or more liquid pumps connected to the fluid inlet measure for pumping liquid through the reactor or each reactor, and a flow meter means to measure the flow of liquid through the reactor or each reactor, wherein the method includes the step of interrupting voltage across the electrodes when the flow of liquid is below a predetermined flow rate.

35. A method as in claim 21 for an electrolytic liquid treatment apparatus further comprising redox probe means for measuring the redox of the liquid, solids dosing means for dosing the liquid with solids, wherein the method includes the step of activating the solids design means to does the liquid when the redox of the liquid as measured by the redox probe is past a predetermined level.

* * * * *